A. W. SCOTT.
Tool-Handles.
No. 156,179.  Patented Oct. 20, 1874.
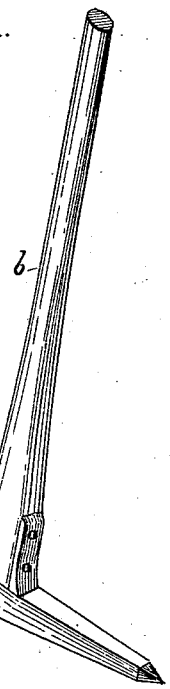
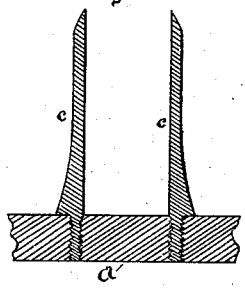
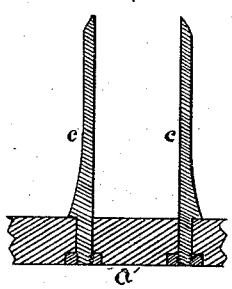
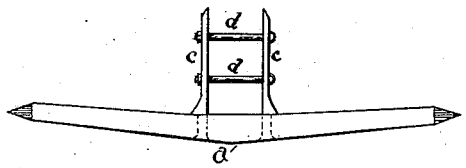
Attest.
G. S. Scott
David J. Sims
Inventor.
Adelbert W. Scott

UNITED STATES PATENT OFFICE.

ADELBERT W. SCOTT, OF BATTLE CREEK, MICHIGAN, ASSIGNOR OF ONE-HALF HIS RIGHT TO LUCIUS S. SCOTT, OF SAME PLACE.

IMPROVEMENT IN TOOL-HANDLES.

Specification forming part of Letters Patent No. 156,179, dated October 20, 1874; application filed October 3, 1874.

*To all whom it may concern:*

Be it known that I, ADELBERT W. SCOTT, of the city of Battle Creek, of the county of Calhoun and State of Michigan, have invented a new and useful Improvement in Tool-Handles, of which the following is a specification, reference being had to the annexed drawings, forming a part thereof.

My invention relates to an improvement in the method of securing handles to miners' picks and other tools of a similar construction; and it consists in the method of securing the side straps which hold the handle to the tool, as hereinafter described and claimed.

Figure 1 of the drawings is a perspective view of my invention applied to a miner's pick. Fig. 2 is a section, showing one method of inserting the straps into a pick. Fig. 3 is a section, showing the straps held in place by a nut. Fig. 4 shows the straps and bolts which hold the handle in place.

In order to enable others skilled in the art to which my invention appertains to make and use the same, I will now proceed to describe more fully its construction and operation.

Similar letters refer to like parts in each of the figures of the drawing.

The two metallic straps $c$ $c$ are used for the purpose of securing the handle to the tool $a$, each of them having, at the end which connects it with the tool, a screw-shank, which is screwed into a suitable orifice in the tool $a$, as shown in Fig. 2 of the drawing, or is inserted into the tool, and secured by a nut embedded into its outer surface, as shown in Fig. 3. The straps have each a shoulder, as seen in the drawings, though the shoulder might be dispensed with when they are constructed as shown in Fig. 2, in which case the screw-thread may take its place, as it will be sufficiently strong and stiff without the shoulder. The straps are connected to the handle $b$ by two or more bolts, $d$, secured by nuts, as shown in Fig. 4.

In some cases it will be found sufficient to pass the shank of the strap through the hole in the tool, and rivet its end firmly into a countersink formed in its outer surface.

It will be seen that this invention is applicable to many other tools as well as picks. It will also be evident that a handle secured to a tool in this manner will be very strong—more so than when secured by most of the modes now in use.

I do not claim the two straps in connection with the tool and handle, as I know they have been used; neither do I claim bolting the straps to the tool; but Having described my invention, what I do claim as new, and desire to secure by Letters Patent, is—

The method of securing handles to picks or similar tools by means of the straps $c$, secured to the tool, substantially as shown and described.

ADELBERT W. SCOTT.

Witnesses:
 LUCIUS S. SCOTT,
 DAVID J. SIMS.